3,418,993
SINGLE-CYLINDER EXPERIMENTAL ENGINE
Andreas Scheiterlein and Othmar Skatsche, Graz, Austria,
assignors to Hans List, Graz, Austria
Filed Apr. 12, 1967, Ser. No. 630,413
Claims priority, application Austria, Apr. 20, 1966,
A 3,735/66
4 Claims. (Cl. 123—195)

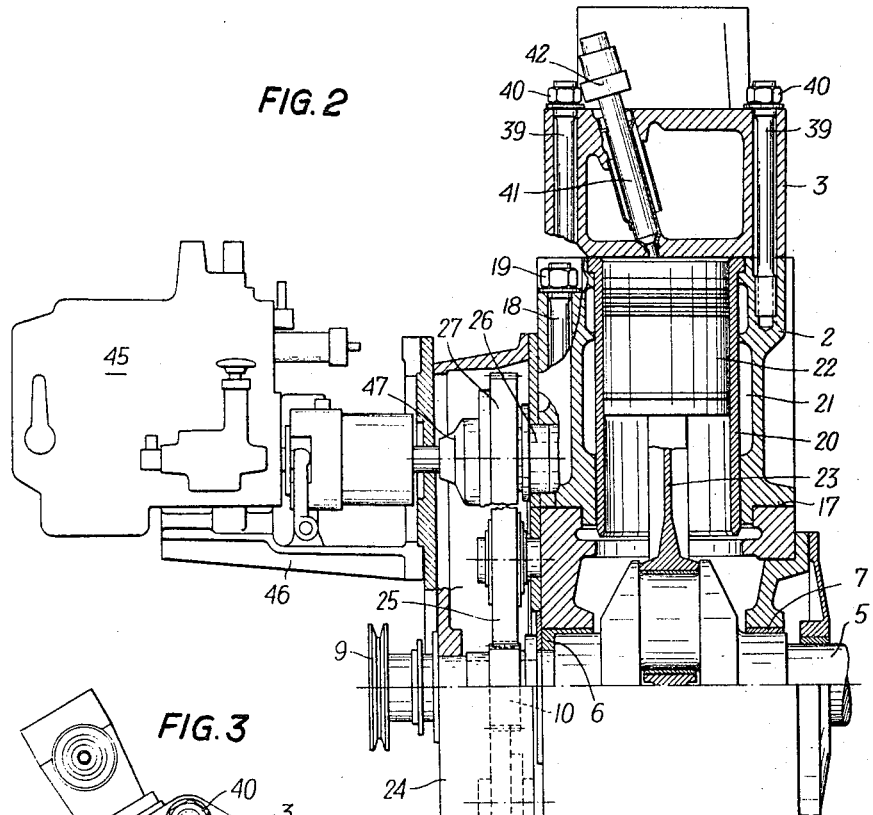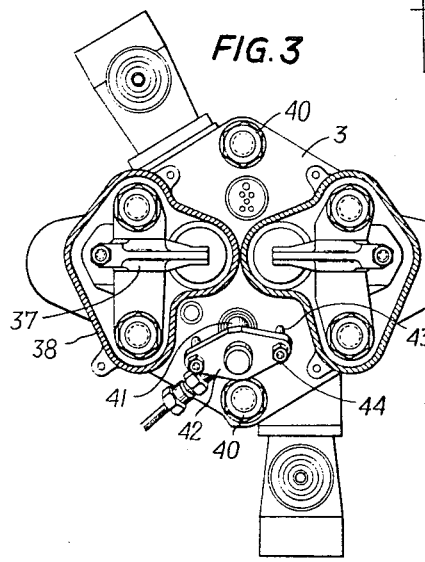

ABSTRACT OF THE DISCLOSURE

A single-cylinder internal-combustion-engine as an experimental engine having a crankshaft and case with the case carrying an interchangeable cylinder block and head. The crankcase has bearing supports and a camshaft is mounted in any one of the bearing supports. An ignition device is provided with a drive shaft mounted selectively in any one of the bearing supports and at least one drive shaft is selectively located in any one of the bearing supports with at least one drive shaft provided for an auxiliary machine.

---

Figure 1:
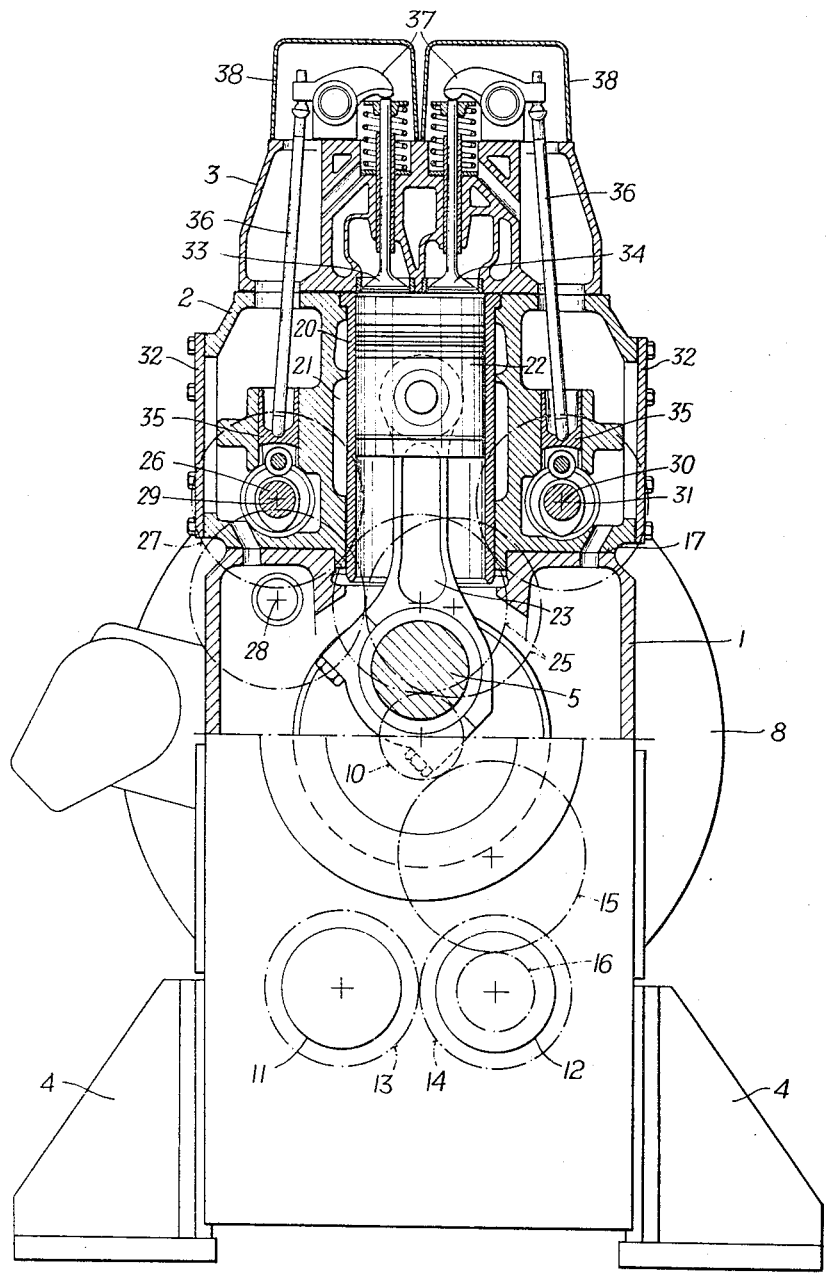

The invention relates to a single-cylinder experimental engine comprising an interchangeable cylinder block and cylinder head mounted on the crankcase. Similar experimental engines are used for development and research work in view of future serial production and as a rule, designed separately for each cylinder size. Work with experimental engines affords valuable knowledge regarding the most convenient location and design of vital engine parts, such as for example, with regard to the design of the combustion chamber and pistons, as well as of all structural elements responsible for the gas-changing process and a number of other uses. Similar experimental engines permit accurate measurements of the pressure or stress pattern, temperature distribution in engine parts subject to thermal stresses, and also serve to study heat transfer and cooling problems and provide a realistic forecast of the basic operational behavior of the multicylinder engine.

Although substantial savings both in respect of the measuring means and time required for preparation and assembling are attainable by the use of a single-cylinder experimental engine as compared with the method of testing multicylinder engines during the development of engines intended for serial production, a drawback of conventional types of similar single-cylinder experimental engines resides in their relatively limited application. For example, the development and practical testing of the valve gear calls for expensive and time-consuming rebuilding of the experimental engine involving substantial alterations of its basic design. Otherwise it is impossible to design the control mechanism of the experimental engine in accordance with the planned layout and dimensions of the serially produced engine.

It is the object of the invention to provide a single-cylinder experimental engine permitting not only performance of the usual research and development tasks, but making it also possible for the valve gear of the actual design to be adapted essentially to meet the requirements of the actual serially produced engine without altering the basic design of the experimental engine. According to the invention this problem is solved by providing a bearing support in the crankcase in the proximity of the cylinder block for the optional location of one or of a plurality of camshafts for the drive of a valve gear and/or an injection pump, an ignition device or other auxiliary assemblies, another bearing support in the cylinder block on both sides of the cylinder and if necessary, an additional bearing support in the cylinder head. This arrangement provides an opportunity for using the same experimental engine for the testing and development of various types of internal combustion engines and in particular, for arranging and testing the valve gear in a manner corresponding to the actual design of the multicylinder engine. The conventional design of single-cylinder experimental engines usually provides for a single bearing support for the camshaft in the crankcase in the proximity of the cylinder-block mounting surface. However, this location of the camshaft essentially answers only the principles of design of conventional diesel engines in the medium speed range.

As a result of the present invention, the application of experimental engines is extended to cover also the development of high-speed internal combustion engines without major alterations of the design of the experimental engine. Since short pushrods are generally preferred for the operation of similar engines, it is possible with this particular application of the experimental engine to arrange the camshaft in one of the two bearing supports of the cylinder block so as to simulate the mechanical control system of the multicylinder engine. Likewise, it is possible to use two camshafts located in the two bearing supports in the cylinder block at the same time. For purposes of development, this arrangement offers an advantage insofar as the two camshafts can be speedily and conveniently adjusted individually, thus making it possible for example to study the influence of different timings without the need for camshaft changes.

However, according to the invention it is also possible to actuate the inlet and the exhaust valve separately by means of two camshafts located in the cylinder block with the pushrods actuating the valves via two opposite valve rockers on the cylinder head. The particular advantage of this arrangement resides in the fact that ample space is available on the surface of the cylinder head for the accommodation of a number of measuring instruments. Thus for example, both a high-pressure transducer and a low-pressure transducer for indication purposes can be easily accommodated on the cylinder head.

In addition, the principle of design of the single-cylinder experimental engine according to the invention permits the use of pump-and-nozzle assemblies accommodated in the cylinder head and usually actuated by means of the camshaft via pushrods and rocker arms. Consequently, provision can be made for the operation of the valve by means of a camshaft located in the cylinder block while the pump-and-nozzle assembly is actuated by means of a camshaft located on the opposite bearing support in the cylinder block and equipped with an injection cam. This arrangement also permits individual adjustment of the two camshafts.

For the development of heavy-duty engines of advanced design, the bearing support occasionally provided in the cylinder head permits a broad imitation of the assembling and operating conditions ultimately envisaged for the serially produced multicylinder engine. Again, one of the vacant bearing supports may be used for the accommodation of an additional camshaft for the operation of the fuel-injection pump or of an ignition device.

According to another embodiment of the invention the camshaft(s) located in the crankcase and/or cylinder block are driven by the crankshaft via a toothed-wheel gearing, and the camshaft, if any, arranged in the cylinder head via a toothed-wheel gearing or chain drive by means of an intermediate shaft, such as for example, one of the camshafts located in the cylinder block. Therefore, the toothed wheels and other gearing elements may be conveniently located at the flywheel end of the experimental engine in an easily accessible and compact arrangement. For the toothed-wheel gearing or chain drive of a camshaft located in the cylinder head a special housing is preferably provided which can be conveniently flange-mounted on the gearbox cover of the engine. Proper meshing of the toothed wheels of both gearings is assured by appropriately centering the said housing on the gearbox cover.

According to a preferred embodiment of the invention the toothed-wheel gearing driven by the crankshaft comprises an orientable idler gear engaging in one of its positions the pinion of a camshaft located in the crankcase, and in its other position the pinion of a camshaft located in the cylinder block, thereby facilitating and expediting the changeover from one camshaft location to the other.

Figure 4:
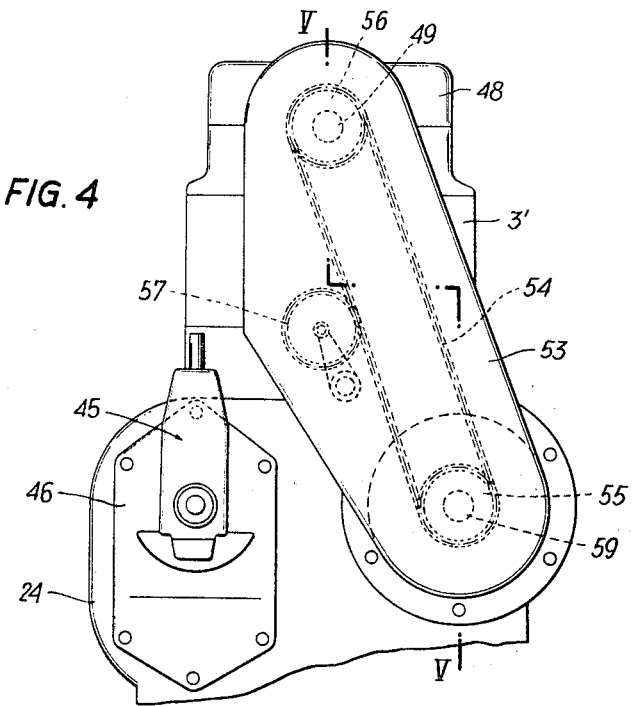
Figure 5:
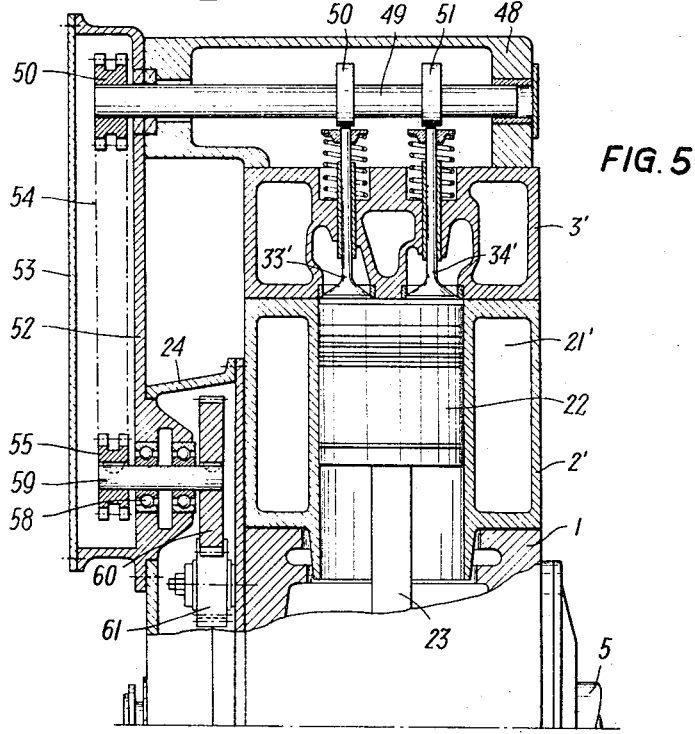

Further details of the invention will appear from the following description of several embodiments of the invention with reference to the accompanying drawing in which:

FIG. 1 shows a partial cross-sectional view of a single-cylinder experimental engine according to the invention, FIG. 2 a sectional side elevation of the engine illustrated in FIG. 1, FIG. 3 a top plan view of the cylinder head of the same experimental engine, FIG. 4 a front elevation of the upper portion of another variant of the experimental engine according to the invention with the camshaft on top, and FIG. 5 a cross-sectional view of the engine on line V—V of FIG. 4.

The basic design of the experimental engine comprises essentially a box-type crankcase 1 with an interchangeable cylinder block 2 mounted thereon and an equally interchangeable cylinder head 3. The crankcase 1 is equipped with screwed-on bed brackets 4 of welded design. Inside the crankcase 1 the crankshaft 5 rotates in bearing bushes 6 and 7. At one extremity the crankshaft 5 carries a flywheel 8 (FIG. 1) and at the other extremity a V-belt pulley 9 driving a water pump or other auxiliary units. The driven gear wheel of the crankshaft 5 located between the V-belt pulley 9 and the bearing bush 6 is designated by reference number 10.

In the lower portion of the crankcase 1 two counterbalance shafts 11 and 12 positively interconnected contrarotatively by means of spur gears 13 and 14 are located. The drive of the counterbalance shafts 11 and 12 is through the driven gear wheel 10 of the crankshaft 5 via an idler gear 15 and a gear wheel 16 mounted on the counterbalance shaft 12.

The cylinder block 2 resting upon the upper mounting flange 17 of the crankcase 1 is attached to the crankcase by means of stay bolts 18 and nuts 19. Inserted in the cylinder block 2 is the cylinder liner 20 defining a cooling-water chamber 21 with the wall of the cylinder block. The piston located inside the cylinder liner 20 is designated by reference number 22 and the connecting rod by reference number 23.

A gearbox cover 24 is flange-mounted on the front end of the crankcase 1 and of the cylinder block 2 and includes in addition to the gearing for the counterbalance shafts 11 and 12 an additional spur gearing for the drive of the valve gear, the fuel injection pump and such auxiliary units as may be provided for the experimental engine. This gearing comprises an orientable idler gear 25 engaging the driven gear wheel 10 of the crankshaft 5. On the other side, the idler gear 25 engages a drive gear 27 mounted on a camshaft 26. For the accommodation of the camshaft 26 any of two different bearing supports 28 and 29 are selectively available, the bearing support 28 being located in the crankcase 1 in the proximity of the mounting flange 17 for the cylinder block 2 and the other bearing support in the cylinder block 2 beside the cylinder liner 20. The two positions of action of the gear wheels 25 and 27 for the two selective locations of the camshaft 26 are indicated by dash-dot lines in FIG. 1.

Opposite the bearing support 29 in symmetrical relation to the cylinder axis a third bearing support 30 is provided wherein an additional camshaft 31 is located. In order to illustrate the basic arrangement more clearly, the drive of the camshaft 31 is not shown in the drawing. The camshafts 26 and 31 are accessible through lateral openings of the cylinder block 2 closed by means of screwed-on covers 32.

Referring to the embodiment illustrated in FIGS. 1 to 3, a separate drive for the valves 33 and 34 located in the cylinder head 3 is provided by means of the camshafts 26 and 31. In each case, the drive is through a roller shaft 35, a short pushrod 36 and a valve rocker 37 located in an appropriate rocker box 38 on top of the cylinder head 3. The camshafts 26 and 31 being individually adjustable, the effect of timing on the operational behavior of the engine can be conveniently studied without exchanging camshafts.

An injection nozzle 41 inclined in relation to the cylinder axis extends through the cylinder head 3 screwed on to the cylinder block 2 by means of stay bolts 39 and nuts 40. The injection nozzle is held down by a clamping means 42 by means of screw bolts 43 and tightening nuts 44 attached to the cylinder head 3. By means of a delivery pipe (not shown) the injection nozzle 41 is connected to the injection pump 45 flange-mounted on the front end of the gearbox cover 24 by means of a bracket 46. The injection pump 45 is positively connected with the camshaft 26 by means of a coupling 47.

The overall layout of the experimental engine illustrated in FIGS. 1 to 3 is essentially based upon the principles of design of serially produced high-speed engines, particularly with regard to the arrangement of the valve gear.

For development and research work in connection with heavy-duty engines of advanced design generally provided with an overhead camshaft, the experimental engine is preferably equipped according to the embodiment of the invention illustrated in FIGS. 4 and 5. Practically only the cylinder block and the cylinder head of the engine are replaced while preserving the structural unit comprising a crankcase 1 and the various elements accommodated therein as well as the front-end toothed-wheel gearing. In the present instance the cylinder block 2' is double-walled and comprises a large cooling-water chamber 21'. Inside the cylinder head 3' the two valves 33' and 34' are offset by 90 degrees as compared with their location in the first-mentioned embodiment of the invention. Their drive is through a single camshaft 49 located in a box 48 on top of the cylinder head 3' by means of cams 50 and 51. The camshaft 49 is positively connected with the crankshaft 5 via an appropriate idler gear. In this embodiment of the invention the said idler gear, located in a separate housing 52 with cover 53, flange-mounted on the gearbox cover 24 is designed as a chain drive comprising a timing chain 54, two sprocket wheels 55 and 56 and an orientable tension chain wheel 57. The sprocket wheel 56 is attached to the free gear-end extremity of the camshaft 59, whereas the driven-end sprocket wheel 55 is located at the outer extremity of an intermediate shaft 59 supported by means of two ball bearings 58 in the gear housing 52, and carrying a gear wheel 60 at its inner extremity. The location of the intermediate shaft 59 corresponds to the bearing support 30 of the camshaft 31 in the engine layout illustrated in FIGS. 1 to 3. The drive of the intermediate shaft 59 is through an idler gear 61 in mesh with the gearwheel 60 and mating the driven-end gearwheel (not shown) of the crankshaft 5.

The possibility of selectively locating one or two camshafts in any of four available bearing supports permits a number of variants both for the valve gear and for the operation of the injection pump and/or other auxiliary units. For example, one camshaft can be used to drive a pump-and-nozzle assembly in the cylinder head and another camshaft equipped with a make-and-break cam for ignition timing. In each of these cases the basic design of the experimental engine assures a speedy and convenient changeover of the engine involving merely the replacement of a few structural elements suitable for assembly according to the construction box principle. The versatility of such an experimental engine makes it possible for any person skilled in the art to adapt a novel design already in its development and experimental stages to a considerable extent to the envisaged operating conditions of the actual serially-produced engine.

We claim:

1. An internal-combustion-type experimental engine comprising a crankcase, an interchangeable cylinder block mounted on top of the said crankcase, an interchangeable cylinder head mounted on top of the cylinder block, at least one intake and exhaust valve arranged in the said cylinder head, a crankshaft located in said crankcase, a driven gearwheel arranged at an extremity of the said crankshaft at the front end of the crankcase, a bearing support located laterally above the said crankshaft in the proximity of a connecting surface of the said cylinder block, two additional bearing supports located in the said cylinder block on both sides of the cylinder, at least one camshaft selectively provided in one of said bearing supports and serving to drive the said valves, a driving gearwheel at one end of the camshaft, and an intermediate gearwheel orientably arranged on the front end of the crankcase and engaging in the said driving gearwheel of the crankshaft and the said driving gearwheel of the camshaft.

2. An internal combustion engine according to claim 1, comprising a housing mounted on top of the said cylinder head, an overhead camshaft for the direct drive of the said valves and located in the said housing, a driving gearwheel arranged at one extremity of the said camshaft, and an intermediate gearing provided between the said orientable intermediate gearwheel and the driving gearwheel of the last-mentioned camshaft.

3. An internal combustion engine according to claim 2, wherein the said intermediate gearing is in the form of a spur gear.

4. An internal combustion engine according to claim 2, wherein the said intermediate gearing is in the form of a chain-drive type.

References Cited

UNITED STATES PATENTS

| 1,898,459 | 2/1933 | Newcomb | 74—604 |
| 2,919,688 | 1/1960 | Bowditch et al. | 123—1 |
| 3,094,190 | 6/1963 | Conover et al. | 123—195 XR |
| 3,203,274 | 8/1965 | Barth et al. | 123—192 XR |

FOREIGN PATENTS

| 370,955 | 4/1932 | Great Britain. |
| 1,002,337 | 10/1951 | France. |
| 1,094,021 | 12/1954 | France. |

OTHER REFERENCES

The High Speed Internal-Combustion Engine, by Harry R. Ricardo, revised by H. S. Glyde, 3d edition (reprinted 1944).

Interscience Publishers, Inc., 215 4th Ave., New York, N.Y., p. 286.

WENDELL E. BURNS, *Primary Examiner.*

U.S. Cl. X.R.

123—1, 90, 192